(12) United States Patent
Naghshin et al.

(10) Patent No.: US 11,893,365 B2
(45) Date of Patent: Feb. 6, 2024

(54) SEMANTIC DESIGN SYSTEM

(71) Applicant: Oracle International Corporation, Redwood Shores, CA (US)

(72) Inventors: Rozita Naghshin, San Francisco, CA (US); Lynn Munsinger, Monona, WI (US); Kathleen Maguire Candland, San Francisco, CA (US); Hillel Noah Cooperman, Seattle, WA (US); Mohammed Amirali Samji, Redmond, WA (US); Blake Thomas Sullivan, San Francisco, CA (US); Duncan Richard Mills, Winchester (GB)

(73) Assignee: Oracle International Corporation, Redwood Shores, CA (US)

( * ) Notice: Subject to any disclaimer, the term of this patent is extended or adjusted under 35 U.S.C. 154(b) by 106 days.

(21) Appl. No.: 17/449,565

(22) Filed: Sep. 30, 2021

(65) Prior Publication Data
US 2022/0107790 A1    Apr. 7, 2022

Related U.S. Application Data

(60) Provisional application No. 63/087,733, filed on Oct. 5, 2020.

(51) Int. Cl.
*G06F 8/38*       (2018.01)
*G06F 8/20*       (2018.01)
*G06F 40/186*   (2020.01)
*G06F 40/30*     (2020.01)
*G06F 3/0482*   (2013.01)

(52) U.S. Cl.
CPC .............. *G06F 8/38* (2013.01); *G06F 8/20* (2013.01); *G06F 40/186* (2020.01); *G06F 40/30* (2020.01); *G06F 3/0482* (2013.01)

(58) Field of Classification Search
CPC ... G06F 8/20; G06F 8/34; G06F 40/30; G06F 40/1482; G06F 40/186
See application file for complete search history.

(56) References Cited

U.S. PATENT DOCUMENTS

| | | | | |
|---|---|---|---|---|
| 11,221,833 B1* | 1/2022 | Huang | ........................ | G06F 8/10 |
| 2009/0094573 A1* | 4/2009 | Skriletz | ..................... | G06F 8/20 |
| | | | | 717/101 |
| 2016/0092179 A1* | 3/2016 | Straub | ....................... | G06F 8/71 |
| | | | | 717/107 |
| 2017/0031652 A1* | 2/2017 | Kam | ....................... | G06F 3/167 |

* cited by examiner

*Primary Examiner* — Ziaul A Chowdhury
(74) *Attorney, Agent, or Firm* — Invoke

(57) ABSTRACT

Techniques for generating application interfaces based on semantic-level data are described herein. Application developers may semantically define an application flow. Based on the definition, a system may identify a template of a multipage navigable interface that is compatible with the flow. If multiple templates are compatible, then a template may be recommended or automatically selected based on the semantic information provided by the developer. The system may generate, based on the template and the semantic definition, a multipage navigable interface. The template may encapsulate some design and functional elements in a manner that is independent of the semantic definition.

20 Claims, 9 Drawing Sheets

SEMANTIC DESIGN SYSTEM

INCORPORATION BY REFERENCE; DISCLAIMER

This application is hereby incorporated by reference: application No. 63/087,733 on Oct. 5, 2020. The applicant hereby rescinds any disclaimer of claim scope in the parent application or the prosecution history thereof and advise the USPTO that the claimed in this application may be broader than any claim in the parent.

RELATED APPLICATIONS; INCORPORATION BY REFERENCE application is related to U.S. application Ser. No. 17/008,571, filed Aug. 31, 2020, titled "GENERATING A NAVIGABLE INTERFACE BASED ON SYSTEM-DETERMINED RELATIONSHIPS BETWEEN SETS OF CONTENT", the entire contents of which are incorporated herein by reference.

TECHNICAL FIELD

The present disclosure relates to generating an interface based on semantic information associated with an application.

BACKGROUND

When building an application interface, many different factors are typically taken into consideration by a designer to optimize the user experience. For example, the designer may determine an optimal layout, flow, look, and feel for the interface so that a user may intuitively navigate through different application pages. After an initial build of an application interface, a designer may wish to modify all or a portion of the application interface to improve the user experience. However, once an application is in production, rebuilding the application interface often requires modifications to the underlying application source code, which is a cumbersome and error-prone process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
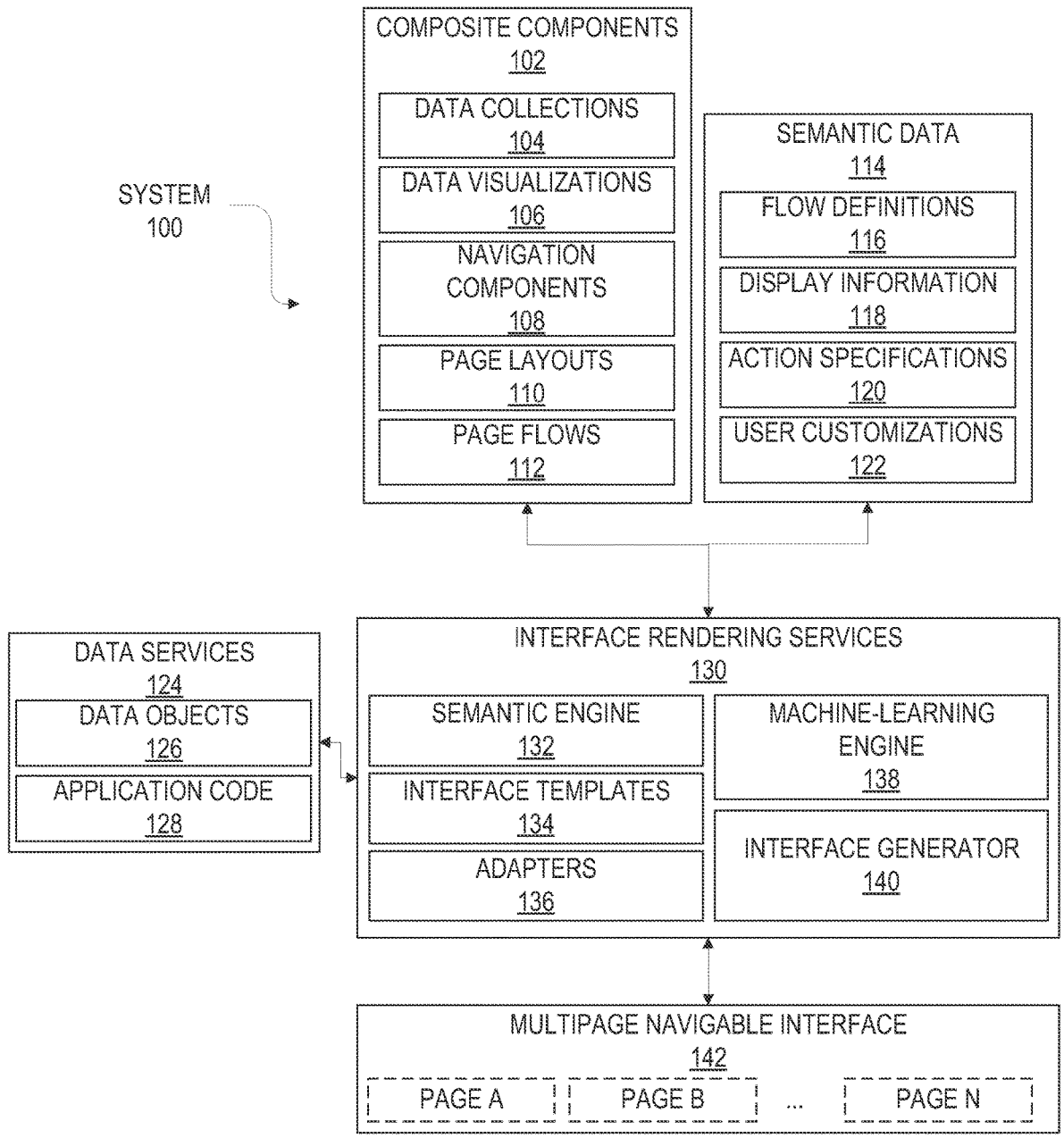
FIG. 1 illustrates a system for generating user interfaces based on semantic information in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM FOR SEMANTICALLY DESIGNING INTERFACES
3. GENERATING MULTIPAGE NAVIGABLE INTERFACES BASED ON SEMANTIC INFORMATION
4. DESIGN UPDATES
5. INCORPORATING MACHINE LEARNING
6. COMPUTER NETWORKS AND CLOUD NETWORKS
7. HARDWARE OVERVIEW
8. MISCELLANEOUS; EXTENSIONS

1. General Overview

Techniques are described herein for generating application interfaces based on semantic information. The techniques allow application developers and frontend designers to create a high-quality user experience by describing the interface semantically without having to explicitly code the user interface design. The user experience may be encapsulated within a set of high-level user interface (UI) components, which may be upgraded with minimal impact to the application development process.

In some embodiments, an application developer semantically defines an application flow. Based on the definition, the system may identify a template of a multipage navigable interface that is compatible with the flow. If multiple templates are compatible, then a template may be recommended or automatically selected based on the semantic information provided by the developer. In other cases, the developer may be prompted to select a template.

In some embodiments, the application developer semantically defines actions and/or information that relate to a page within the multipage navigation interface. A page template may automatically provide an associated experience for the page based on the semantic definition even though many of the design elements may not be specified in the semantic definition. For example, the system may automatically determine how a user invokes an action. Additionally or alternatively, the system may automatically determine the associated messaging protocols for the page, the page layouts, the look and feel of a page, and navigation methods. Thus, the user-experience may be encapsulated within the system, allowing application developers to semantically describe what functions the interface provides without having to hard code any of the functionality relating to how the user interacts with the application interface.

In some embodiments, the system propagates changes to the user experience, as encapsulated by the high-level UI components, to multiple pages built from the components. The system may propagate the changes without requiring any modification of the underlying source code. As an example, the user experience may be upgraded by changing how actions are invoked, how the messaging system is implemented, how users navigate between different pages, and/or the look and feel of the UI components. A single change to one of these components may be propagated to a plurality of pages that have been built using the component. Further, the interface may be updated based on the change while maintaining the same semantic definitions describing the functionality of the page. Thus, the functionality related to the user experience, including the navigation and messaging protocols, may be modified without affecting the functionality semantically defined by the application developers.

In some embodiments, the system leverages machine learning to generate and render application interfaces based on semantic definitions. The system may train a machine learning model to automatically learn relationships between optimal UI characteristics and application characteristics described in the semantic definition. The system may use the trained machine learning model to select and/or customize one or more UI components. Additionally or alternatively, the system may use the trained machine learning model to generate an optimized user experience.

One or more embodiments described in this Specification and/or recited in the claims may not be included in this General Overview section.

2. Architectural Overview

FIG. 1 illustrates a system for generating user interfaces based on semantic information in accordance with some embodiments. As illustrated in FIG. 1, system 100 includes composite components 102, semantic data 114, data services 124, interface rendering services 130, and multipage navigable interface 142. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Composite components 102 represent UI components that are formed from one or more other composite or atomic UI components. A composite component may encapsulate one or more user interactions. Example composite components include data collections 104, data visualizations 106, navigation components 108, page layouts 110, and page flows 112. Additionally or alternatively, other types of composite components may be used.

In some embodiments, data collections 104 are components that display data from data objects, such as a row from a table. System 100 may bind an endpoint associated with data services 124 to display one or more of data objects 126 through a data collection component. During application runtime, one or more requests may be submitted through the associated endpoint to access data. The access requests may conform to one or more communication protocols. For example, a Hypertext Transfer Protocol (HTTP) request that includes one or more structured query language (SQL) commands may be submitted through the endpoint. An HTTP response including data from one or more rows of a table may be returned and associated with the data collection component or underlying adapter that is bound to the endpoint. Additionally or alternatively, a binding interface may implement other communication protocols, including those in the internet protocol (IP) suite and/or query languages to fetch data during application runtime.

In some embodiments, data visualizations 106 are used to present abstract information in a graphical form. Examples include histograms, pie charts, and graphs. System 100 may bind a data visualization to an endpoint associated with data services 124 to provide access to one or more of data objects 126, which may be used to generate the data visualization. Data visualizations 106 and/or the other components described herein may be associated with a binding interface that accesses data as previously described for data collections 104. Each component may consume data differently. For example, a data collection component may present a visual list of rows whereas a data visualization may aggregate values from the rows to render a graphical representation. Different types of data visualization components may also render different graphics for the same set of data, depending on the implementation. Designers may swap components and/or modify core component functions independently without having to modify the binding interface as described further herein.

In some embodiments, navigation components 108 are components that control how a user may navigate through different pages of an application interface. For example, navigation components 108 may define the location and appearance of a "Back" button. Additionally or alternatively, a navigation component may define and encapsulate various functions for the button. In some cases, a user may be prompted to confirm whether they would really like to leave the current page or to save the current information in a draft state. In other cases, the back button may jump to the previous page without any prompt. Other functions may also be defined, depending on the particular application and selected navigation component. The user experience of navigating within the interface may be completely encapsulated by navigation components 108.

In some embodiments, page layouts 110 determine how UI components are arranged on a page. For example, a page layout may determine the size and position of the components, the spacing between components, page themes including backgrounds and colors, and typographical design including fonts and font sizes. The layout of user interface elements may be specified in a style sheet language, such as Cascading Style Sheets (CSS), or using other computer languages.

In some embodiments, page flows 112 include components that implement the flow for a portion of a user interface. For example, if a user accesses a page, then the page flow may instantiate a controller that maintains state information for the page. The page flow controller may use the state information to perform various functions, such as validating a user, browsing data, retrieving data, transferring data between pages, and navigating to another page. A page flow may further manage the actions that are available via an associated page.

Semantic data 114 may define the functionality of a user interface at a semantic level. Semantic data 114 may include flow definitions 116, display information 118, action specifications 120, and user customizations 122. Additionally or alternatively, other types of semantic information may be provided as input into system 100. In some embodiments, semantic information or semantic data has a flexible syntax that is descriptive. For example, the order and/or selection of words to describe a set of functions may not be strict and may vary from user to user. System 100 may then use a set of rules and/or a natural language processing (NLP) based machine learning model to map semantic data 114 to a set of functions. Based on the mappings, system 100 may identify which templates include or are otherwise compatible with the set of functions.

In some embodiments, flow definitions 116 include a high-level description of the flow of an application. A flow definition may include semantic data describing transitions and functions at various application stages. The flow definition may be defined semantically using one or more development tools that provide a visual interface for defining an application flow. For example, a cloud-based service or application may allow a developer to create a set of visual nodes and input one or more application functions associated with the node. The user may further connect nodes using lines or edges to define dependencies and/or transitions between different application functions.

In some embodiments, display information 118 identifies what information should be displayed within an interface. Display information 118 may include customized and user-specified text. For example, a user may specify a title or other text to be displayed in association with a page or action. Additionally or alternatively, display information 118 may include customized and user-specified images. Display information 118 may link user-specified text and/or images with one or more user interface components, which may present the text and/or images at a specified location within or relative to the linked component.

In some embodiments, action specifications 120 define actions that are invokable through a UI page. Actions may include primary actions, and/or secondary actions. A primary action may correspond to any action that initiates at least one database transaction when invoked, and a secondary action may correspond to any action that does not initiate a database transaction. For instance, a user may hit submit to commit the current state information displayed in the user interface page to an underlying database as a primary action. As a secondary action, the user may hit a print button to print the page in its current state, which may not initiate a commit of the data in some implementations. In other embodiments, a primary action may be one cause state information associated with an application page to be saved, and a secondary action may be one that does not trigger a save in the state information. For instance, a secondary action may use data entered into an application page to generate a visualization without committing the data to a database or otherwise persistently storing the data.

In some embodiments, application developers provide semantic data 114. Additionally or alternatively, semantic data 114 may include user customizations 122 provided by an end user of the applications. For example, an end user may semantically define what actions they would like to have available on a given page. Thus, system 100 may aggregate semantic information from multiple sources to generate the set of UI components.

In some embodiments, data services 124 provides a data repository for storing data objects 126 and/or application code 128. A data repository may be any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, data services 124 may be implemented or may execute on the same computing host as one or more other components of system 100 Alternatively or additionally, data services 124 may be implemented or executed on a computing system separate from the components of system 100. Data services 124 may be communicatively coupled to the other components via a direct connection or via a network.

Data services 124 may be an external cloud service, such as a database as a service (DBaaS), part of the same cloud service as one or more other components of system 100 or may otherwise be part of a networked service. Additional embodiments and/or examples relating to computer networks are described below in Section 6, titled "Computer Networks and Cloud Networks."

Data objects 126 may include application data, such as tables, files, and/or other objects. Application code 128 may include application-specific code, such as source code, machine code, and/or intermediate representations that is executable to perform application-specific functions. A developer or other user may bind data objects 126 and/or application code 128 to one or more of composite components 102. A bind provides a link between the component and the associated object and/or application code that may affect how the component is rendered in the user interface. For example, a data collection or visualization may present information visually based on the underlying data stored in the associated data objects. As another example, the function that is performed when a user selects a button may depend on the application code that is bound to the button.

Interface rendering services 130 provides components that allow for interfaces to be automatically customized, streamlined, and generated based on semantic data 114. In some embodiments, interface rendering services 130 include semantic engine 132, interface templates 134, adapters 136, machine-learning (ML) engine 138, and interface generator 140.

In some embodiments, semantic engine 132 processes semantic data 114 to determine the UI functionality that a user has semantically described for a given application. Semantic engine 132 may identify interface templates 134 that are compatible with the described functionality. Additionally or alternatively, based on the provided semantic data 114, semantic engine 132 may automatically select which composite components 102 to include within a page and determine how to organize and structure the selected components. Additionally or alternatively, semantic engine 132 may further configure or customize UI components based on the semantic data.

In some embodiments, interface templates 134 provide arrangements of composite components 102 that are customizable based on semantic data 114. For example, a page interface template may be associated with a specific data visualization, page layout, navigation method, and/or page flow. As another example, interface templates 134 may include flow templates that define a series of page templates.

System 100 may select a flow template for an application based on the semantic information describing the application functionality.

In some embodiments, adapters 136 provide a layer between composite components 102 and data services 124. When binding a data object or application code to a component, the binding may take place through an adapter. During updates, components associated with an adapter may be swapped, allowing the interface to be redesigned without affecting the underlying application data and source code.

In some embodiments, ML engine 138 trains models to learn relationships between application characteristics determined from semantic data and optimal UI characteristics, such as layouts, page flows, navigation, visualizations, etc. ML engine 138 may use the trained models to make recommendations to developers about templates and UI configurations. Additionally or alternatively, ML engine 138 may use the trained models to automatically select templates and components based on the provided semantic data.

Interface generator 140 may render and present multipage navigable interface 142 based on the information provided from one or more other services. In some embodiments, multipage navigable interface 142 includes a plurality of pages and components that are selected and organized based on the selected template and provided semantic data 114.

In some embodiments, components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating Multipage Navigable Interfaces from Semantic Information

In some embodiments, system 100 receives semantic information as input from a user, such as an application developer or frontend designer. As previously noted, the semantic information may describe high-level application and/or interface information. Based on the semantic information, system 100 may identify a set of one or more multipage navigable templates that are compatible with the application and/or interface functionality. System 100 may allow the user to customize or otherwise modify the set of UI components on each page in the template. During application runtime, system 100 may render the multipage navigable interface based on the template and custom design information. Application developers, interface designers, or other users may thus quickly create a frontend application interface without needing to write source code.

Figure 2:
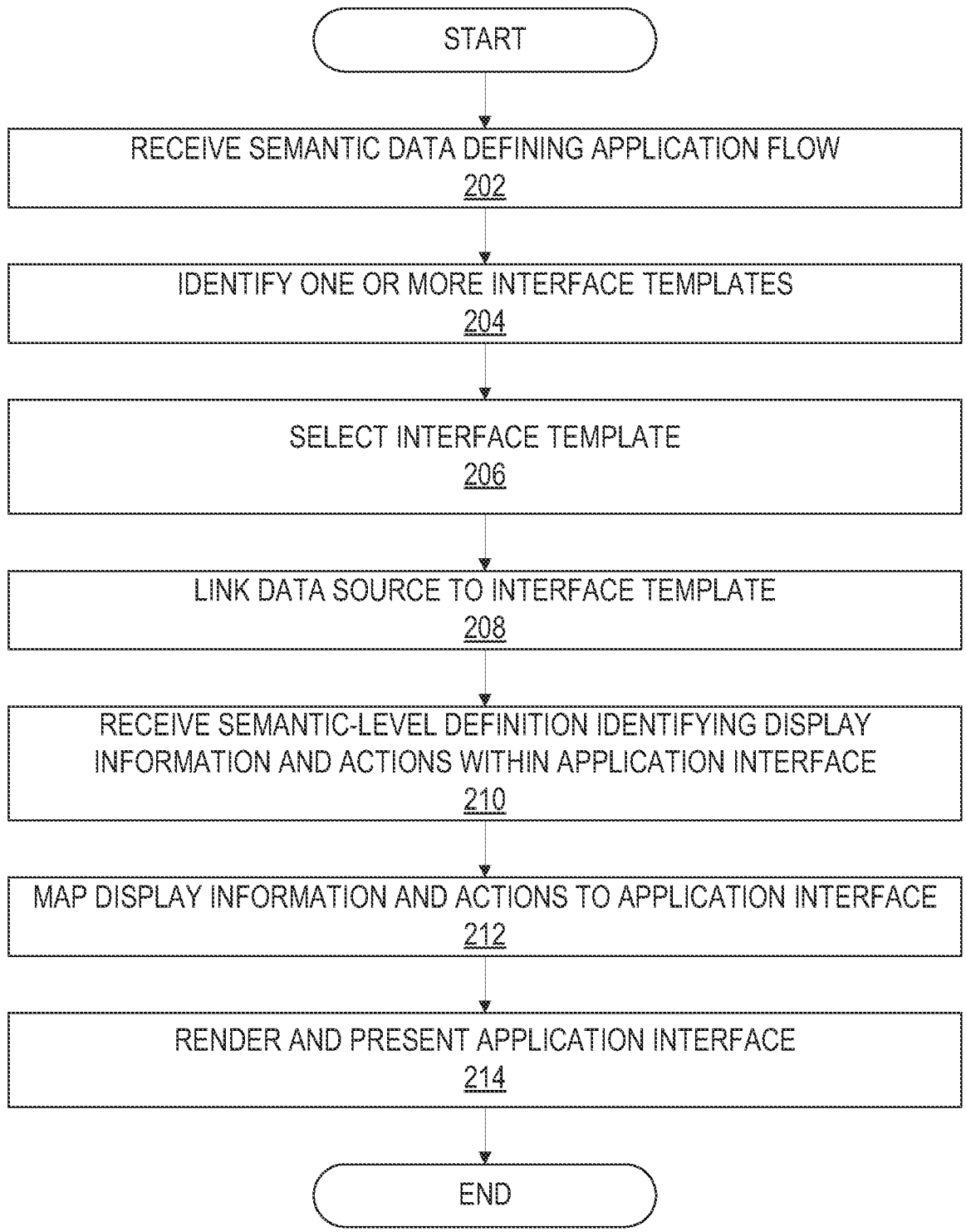
FIG. 2 illustrates an example set of operations for generating a multipage navigable interface based on semantic information in accordance with some embodiments.

FIG. 2 illustrates an example set of operations for generating a multipage navigable interface based on semantic information in accordance with some embodiments. One or more operations illustrated in FIG. 2 may be modified, rearranged, or omitted altogether. Accordingly, the particular sequence of operations illustrated in FIG. 2 should not be construed as limiting the scope of one or more embodiments.

Referring to FIG. 2, a process receives semantic data defining an application flow (operation 202). In some embodiments, application developers may define an application flow visually through a cloud service or application. For example, the user may create a set of nodes, where each node represents a set of one or more functions. The user may connect nodes with directed edges or lines to indicate transitions and dependencies between different functions. The semantic data, including visual flow elements and functional descriptions, may be processed by semantic engine 132, which may map the data to compatible multipage navigable interface templates. Semantic engine 132 may apply rules, NLP and/or machine-learning models, as described further herein, to map the semantic data to compatible interface templates and components.

Figure 3:
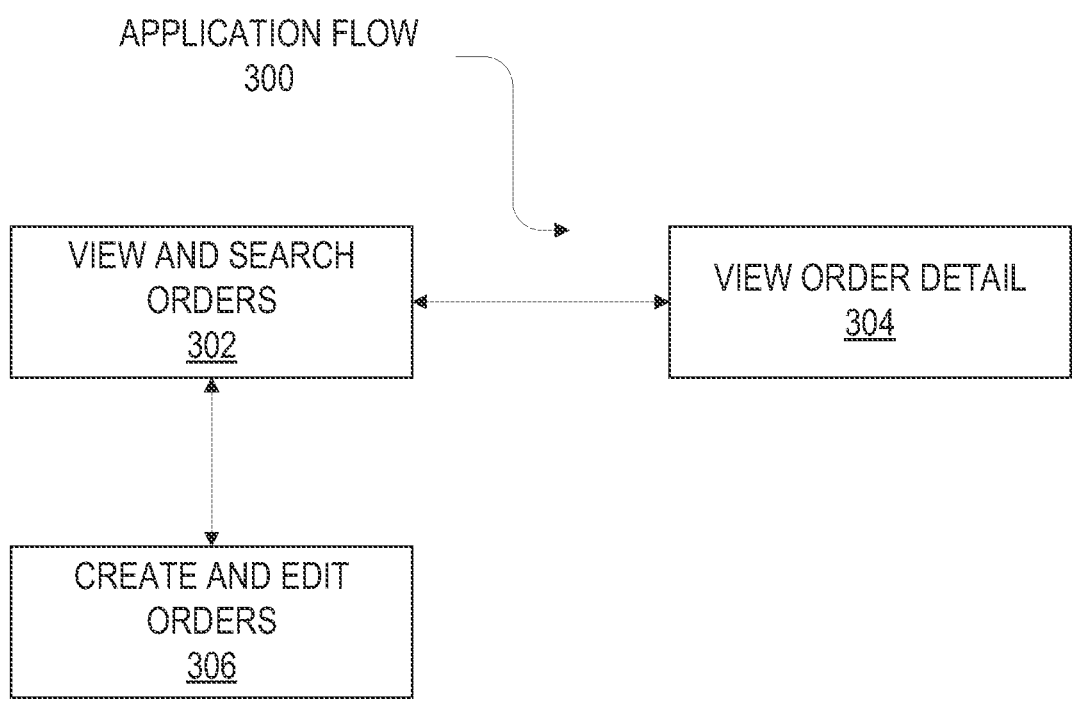
FIG. 3 illustrates an example application flow in accordance with some embodiments.

FIG. 3 illustrates an example application flow 300 in accordance with some embodiments. Application flow 300 includes node 302, node 304, and node 306, which are connected by directed edges. Each of the nodes includes a high-level description of different application functions. Semantic engine 132 may process application flow 300 to map the data to a set of functions. Specifically:

Node 302 is mapped to functions for viewing and searching orders;

Node 304 is mapped to functions for viewing order details; and

Node 306 is mapped to the functions for creating and editing orders.

The directed edges indicate different state transitions representing how an end user may navigate within the application flow. Semantic engine 132 may identify UI components, including navigation components, that enable the defined transitions and flow.

Referring again to FIG. 2, the process identifies a set of one or more interface templates for a multipage navigable page that are compatible with the defined application flow (operation 204). In some embodiments, a compatible interface template for a multipage navigable interface includes a set of pages and associated composite components that support the defined application functions and flow. With respect to application flow 300, for instance, the process may identify a flow template that is a composite of three different page templates: a smart filter and search page template, a simple object detail page template and a create and edit order page template.

In some embodiments, identifying the set of one or more compatible interface templates may include searching a set of predefined templates. In other embodiments, system 100 may dynamically generate a template based on the provided semantic data. For example, system 100 may aggregate a set of UI components to generate a new interface template that was not previously defined. Additionally or alternatively, system 100 may remove or otherwise exclude one or more UI components from a predefined template that are extraneous or not compatible with the semantically defined application or interface functionality.

Referring to FIG. 2, the process further selects an interface template (operation 206). The selection may be performed by a developer or automatically. During this operation, the process may use a trained ML model to recommend or automatically select the template, as described further below in Section 5, titled "Incorporating Machine Learning." In other embodiments, the process may present a set of compatible templates to the developer if more than one interface template exists. The developer may be prompted to select and/or modify the templates to proceed with creating the multipage navigable interface of the application.

In some embodiments, the selected template encapsulates the stylistic and functional attributes of how a user interacts with the application. For example, the flow template selected for application flow 300 may completely encapsulate the navigation of transitioning between the detail page and create page. As another example, the flow template may include appropriate messages for dirty data warnings, confirmations, and other data operations. In yet another example, the flow template may define a save model controlling when a transaction may be submitted (e.g., a user may not be able to submit a transaction unless all fields are populated with data; a user may be required to select a confirm message before a transaction is initiated). Additionally or alternatively, the flow template may define the types of user interface components (e.g., buttons, drop-down menus, etc.), the available interactions between the user and the user interface components, the page layout, the page flow, and component sizes. While the template may be selected based on the provided semantic information, the implementation/definition of these components may be independent of the semantic definition. Thus, the application developer may integrate a UI for an application by describing what functionality they would like without having to syntactically define how the functionality is implemented.

In some embodiments, the process links a data source to the interface template (operation 208). The process may prompt the user to identify the data source or automatically select a default data source. The data source may be accessed through a cloud service, such as a DBaaS or a platform-as-a-service (PaaS). Additionally or alternatively, a data source may be local or located in a shared network environment.

The process further receives a semantic-level definition identifying information to display and actions to make available in the multipage navigable interface (operation 210). For example, a developer may specify the text to be displayed within a component, what primary actions should be made available, and/or what secondary actions to make available. The developer may further bind data objects and/or application code to specified components.

Responsive to receiving the semantic-level definition, the process maps the actions and/or information defined therein to the user interface (operation 212). In some embodiments, this operation maps information and/or actions to adapters. Components may be virtually plugged into and swapped between adapters to facilitate redesign as described further herein.

The process then renders and presents the user interface based on the identified template and mapping (operation 214). In some embodiments, the process incorporates the semantic information into source code for rendering the set of UI components. For example, the process may insert custom text and/or images source locations into the source code. Further, the process may generate and/or order code segments based on the semantic information.

Figure 4:
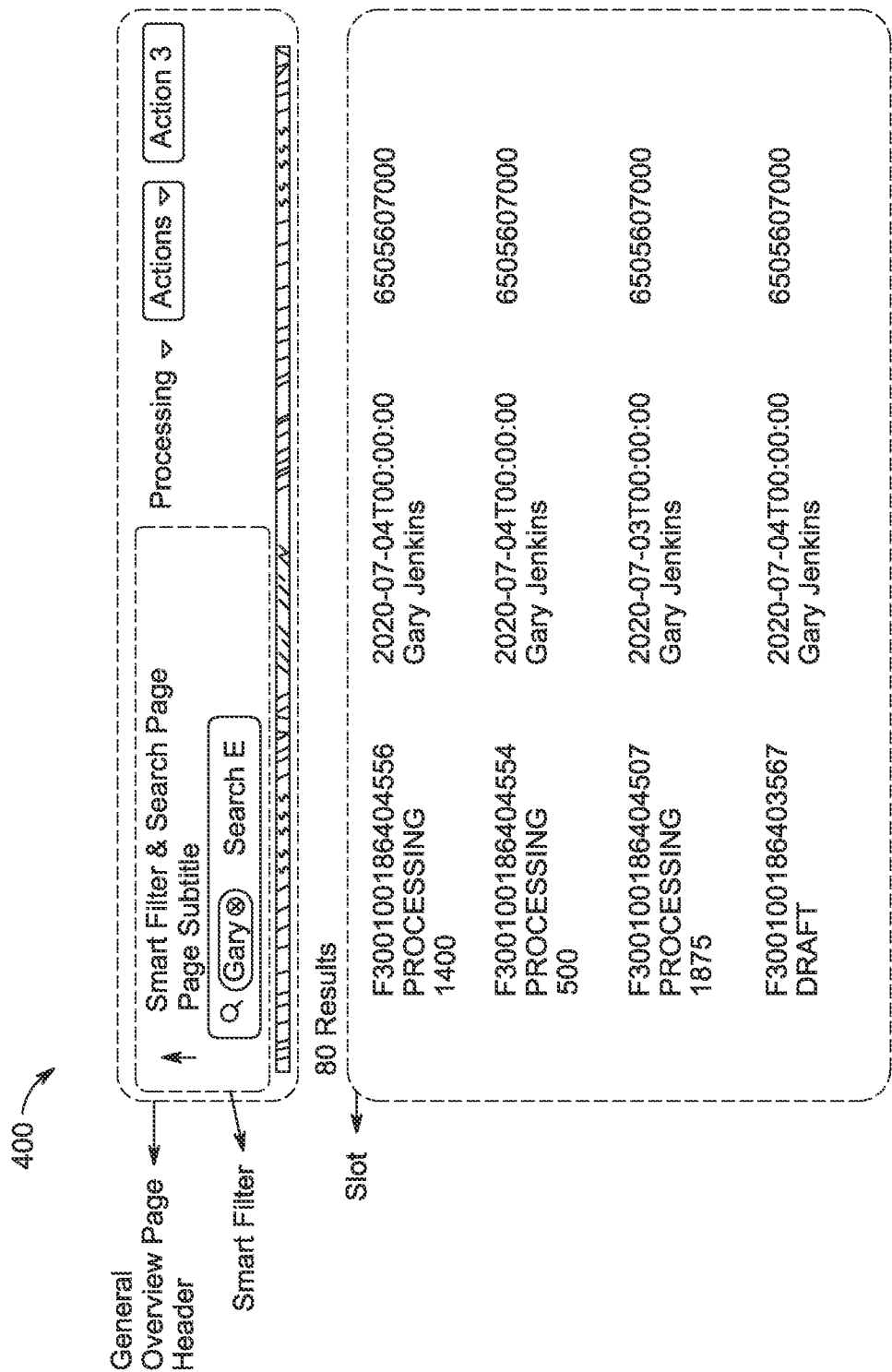
FIG. 4 illustrates an example page template that may be customized based on semantic information in accordance with some embodiments.

FIG. 4 illustrates an example page template 400 that may be customized based on semantic information in accordance with some embodiments. Page template 400 may be selected to use for node 302 above. Page template 400 includes the following parts:
   Generic page header web component 402, which also includes smart filter 404; and
   Slot 406 for insertion of compatible sub-components, such as dynamic lists and list views.

In some embodiments, page template 400 exposes a set of properties via an application programming interface. One or more properties may be required to use the component. Additionally or alternatively, one or more properties may be optional. Example properties include a title, a subtitle, display options for controlling the visible parts of the header components, the actions (primary, secondary) available through the component, and the available smart filters. The properties may be semantically defined and customized by the developer. If a value has not been set for a property, then the system may select a default value, or a corresponding element may be omitted or otherwise excluded from the user interface design.

In some embodiments, smart filter 404 encapsulates a set of functions for populating a list presented through slot 406 during application runtime. During the interface design, a user may link slot 406 to a data source, such as a database or DBaaS. Smart filter 404 may leverage the link with the encapsulated set of functions to perform various operations such as establishing a database link, formulating database queries based on filter criteria provided at application runtime, and formatting the set of results retrieved from the data source. The function logic encapsulated by smart filter 404 may be implemented independently of the data source. Thus, a designer may change the data source linked without affecting the functionality or underlying code of the UI component.

Figure 5A:
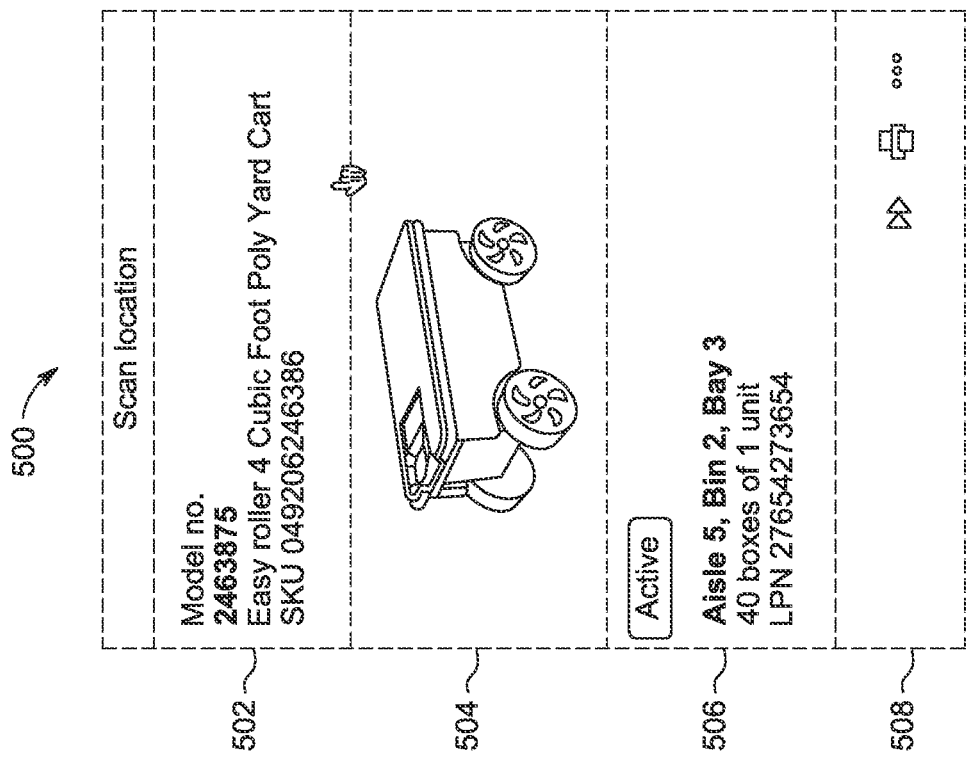
FIG. 5A illustrates an example task card component that may be customized based on semantic information in accordance with some embodiments.

FIG. 5A illustrates example task card component 500 that may be customized based on semantic information in accordance with some embodiments. Task card component 500 provides overview or auxiliary information on a current task. Task card component 500 is a composite component that includes the following sub-components:
   Header region 502 presenting status information about an object;
   Image region 504 presenting an image related to the task;
   Body region 506 presenting secondary information about the object; and
   Footer region 508 presenting supplementary status information about the object.

In some embodiments, task card component 500 is linked to a data object, such as a database record or key. When a task, such as a scan, is performed on the object during application runtime, then the application may present the task card to an application user that present the status information, image, secondary information and supplementary status information. The application user may perform primary actions and/or secondary actions relative to the data object by selecting actions made available through the task card component 500. For example, the user may print a record of the task by selecting the print icon from footer region 508. Developers may customize the primary and secondary actions that are made accessible to the application user through task card component 500.

Figure 5B:
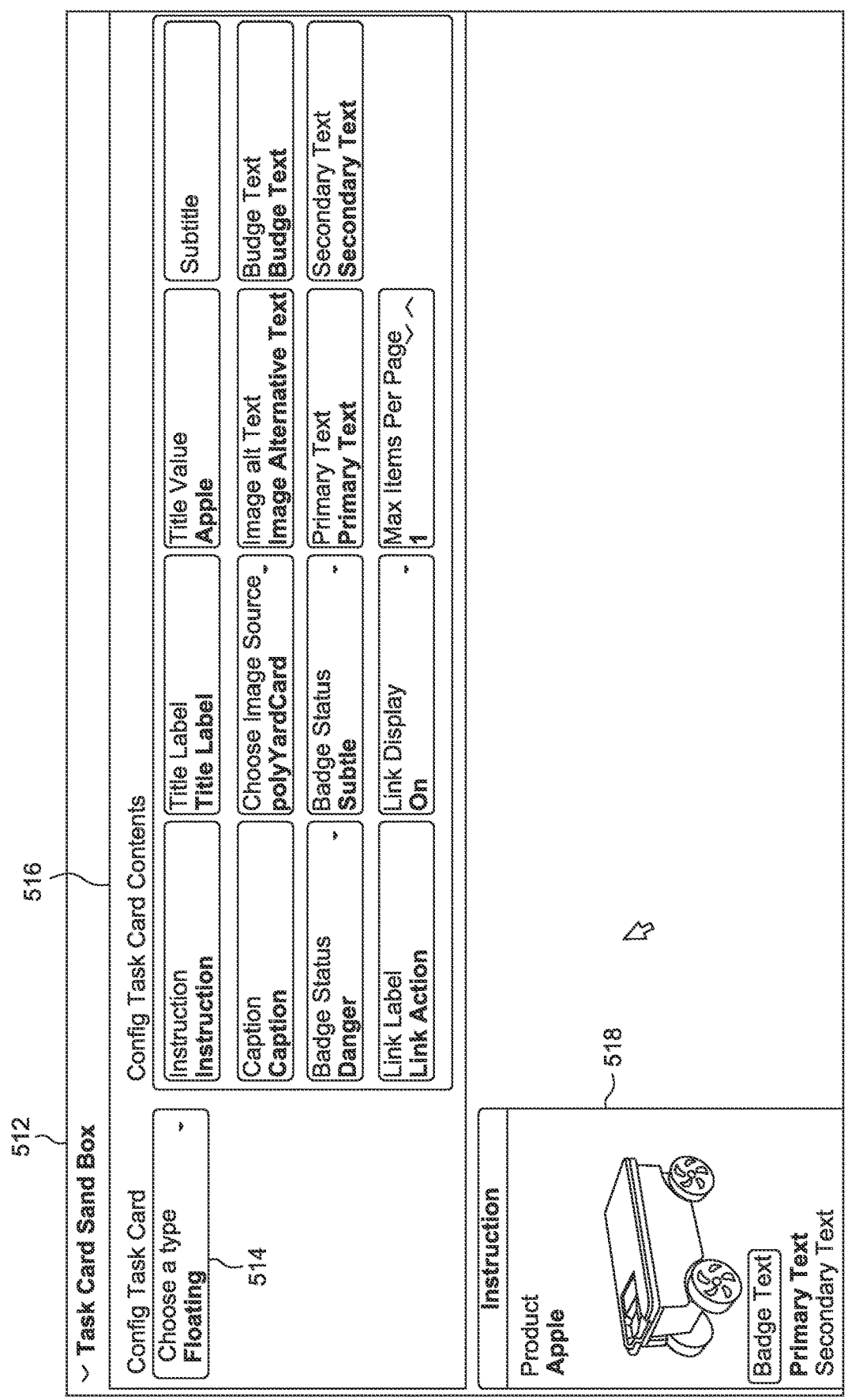
FIG. 5B illustrates an interface for customizing a task card in accordance with some embodiments.

FIG. 5B illustrates an example interface 512 for customizing a task card in accordance with some embodiments. Interface 512 allows a user to define various properties associated with task card component 500. The user may select a task card type through drop-down menu 514. In the present example, the user has selected a floating task card, which renders the task card component in a floating window over another application page. The user may change the task card type to a fixed window within the application page or have the task card be presented on its own application page. Other types may also be available depending on the particular implementation.

Display region 516 includes a set of controls for configuring the contents of task card component 500. Using the text boxes, drop-down menus, and/or other controls, the user may configure properties including titles, subtitles, captions, image source, image text, badge text, badge status, badge style, primary text, secondary text, and linked actions. The properties that are configurable may vary depending on the particular UI component. Compatibility with a set of application function may be determined based in part on the properties. For example, the available primary actions, secondary actions, navigation, and/or other properties of task card component 500 may be compatible or incompatible with a particular set of application functions requested by the developer. If compatible, system 100 may select or recommend task card component 500 to the designer to use as part of an application page. If not, system 100 may recommend a different component or prevent selection of the component.

Preview 518 presents a sample rendering of task card component 518 based on the properties selected through drop-down menu 514 and the controls of display region 516. Preview 518 may be updated in real-time as the user changes properties, such as the task card type and contents, to show effect of how an end user of the application will view the UI component.

Figure 5C:
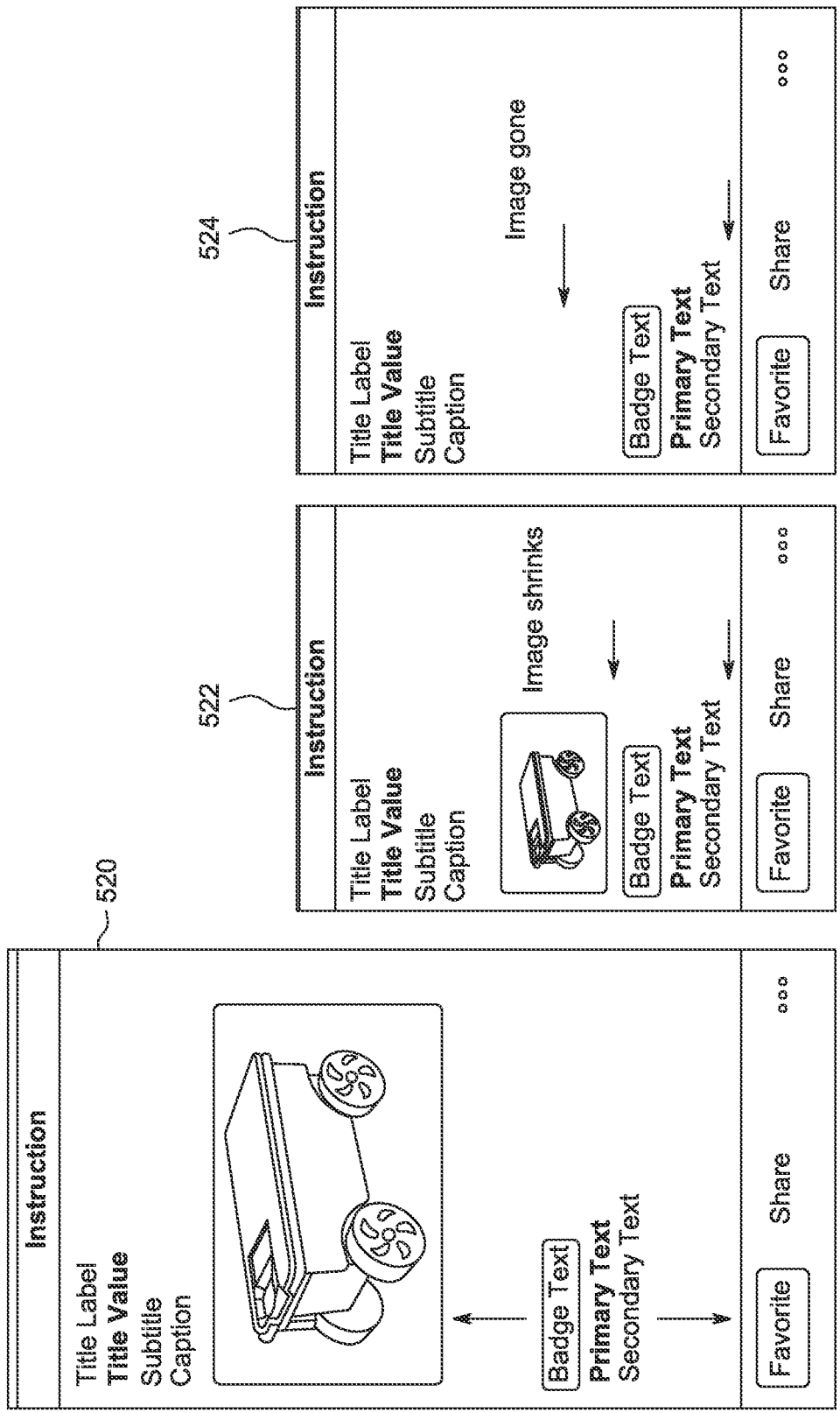
FIG. 5C illustrates example variations in the task card based on runtime properties in accordance with some embodiments.

FIG. 5C illustrates example variations in the task card based on runtime properties in accordance with some embodiments. The task card in the illustrated example is designed to be responsive to both the horizontal and vertical directions. On screens whose width is greater than 400 pixels, the task card is considered "floating" and has a fixed height and a width that may grow until it reaches a maximum size. On smaller screens, the component is edge-to-edge horizontally, which may be implemented using CSS media queries. In this configuration, the task card also fits the available space vertically. The vertical behavior may be implemented as follows:

The process attempts to fit the image at its max height.
        If the image does not fit, the process shrinks the image until it fits or hits threshold percentage of its original height;
        If the image does still does not fit, then it is removed entirely, spreading the remaining space above and below the body content;
        If the image does fit, then any additional space is spread above and below the body content.

Task card window 520 shows an example rendering of task card component 500 where all the sub-components fit. Task card window 522 shows an example rendering of task card component 500 that shrinks the image, selected through image region 504, to fit the window. Task card window 524 shows an example rendering of task card component 500 that removes the image to provide a less cluttered look given the reduced screen real estate. The functionality of removing sub-components may be encapsulated within task card component 500. Thus, the user interface designer may quickly create a user interface for an application without spending time programming such complex interactions.

4. Design Updates

In some embodiments, design updates are triggered based on changes to the provided semantic definitions. For example, a developer may add a series of components to a page template corresponding to the detail page. System 100 may determine, using machine learning or a rules-based approach, that the amount of information in the detail page is too large to be optimally displayed using the current template. In response, system 100 may recommend switching to a different page template that is better suited for the desired component set. The recommended page template may include an additional page, different page layout, and/or different component set to accommodate the increased amount of information. The developer may select the recommended page template to update the application user interface. In response system 100 may update the multipage navigable interface to incorporate the newly selected set of UI components without requiring the developer to change any of the underlying source code or scripts.

Additionally or alternatively, design updates may be triggered based on updates to the UI components made independently of the semantic definitions. For example, a UI designer may update the navigational methods, page flows, layouts, and/or other characteristics of a user interface. A change in a UI component may be propagated to multiple pages across one or more applications that use the UI component. Thus, several application interfaces and associated pages may be updated with a single change.

In some embodiments, users may publish design updates for a set of one or more UI components. For example, the user may update the messaging protocols, look and feel, navigation, primary actions, secondary actions, layout, configuration parameters, and/or other attributes of one or more UI components. Once updated, the changes may be published to developers or other users that have implemented interfaces using the set of UI components. In the case of enterprise software systems that include a suite of software applications, developers or other users may be notified of the update and presented an option to accept or reject the changes. In other implementations, the UI components may be accessible to cloud service subscribers to enable subscribers to quickly build and deploy cloud applications. The cloud service subscribers may be notified of any changes and given an option to incorporate the changes into any applications that use the updated components. In other cases, the publication notification may target end users of the application. The end users may then incorporate the updated UI components or reject the changes. System 100 may maintain a notification list that identifies a set of users to notify when updates to the UI components occur.

In some embodiments, system 100 updates an interface by changing the component that is connected to an adapter. For example, a drop-down menu item may be connected via an adapter to a primary action, which may expose a semantic label associated with the action. After the application has been deployed, the designer may initiate a redesign, swapping the drop-down menu item to a submit button. The same semantic label may be exposed to the updated component, mapping the new component to the same action without requiring updates of any underlying scripts or other code. Similarly, an updated component may replace an older version of the component by swapping the components connected to the adapter. During application runtime, the updated component may interface with the application, data sources, and application users based on the changed adapter connection.

5. Incorporating Machine Learning

In some embodiments, machine learning is involved in recommending and/or automatically selecting interface components. Machine learning includes various techniques in the field of artificial intelligence that deal with computer-implemented, user-independent processes for solving problems that have variable inputs.

In some embodiments, ML engine 138 trains a ML model to perform one or more operations. Training a ML model involves using training data to generate a function that, given one or more inputs to the ML model, computes a corresponding output. The output may correspond to a prediction based on prior machine learning. The output may include a label, classification, and/or categorization assigned to the provided input(s). The ML model corresponds to a learned model for performing the desired operation(s) including labeling, classifying, and/or categorizing inputs. For example, the ML model may be used in determining a likelihood that a template optimizes one or more performance metrics for a given set of semantic data. As another example, the ML model may predict which template a user is most likely to select given a set of user attributes and the set of semantic data.

In some embodiments, ML engine 138 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the ML engine 138 receives positive and/or negative reinforcement in the process of attempting to solve a particular problem (e.g., to optimize performance in a particular scenario, according to one or more predefined performance criteria). ML engine 138 may initially use supervised learning to train the ML model and then use unsupervised learning to update the ML model on an ongoing basis.

In some embodiments, the ML engine 138 may use many different techniques to label, classify, and/or categorize inputs. ML engine 138 may transform inputs (e.g., semantic definitions) into feature vectors that describe one or more properties ("features") of the inputs. ML engine 138 may label, classify, and/or categorize the inputs based on the feature vectors. Alternatively or additionally, ML engine 138 may use clustering (also referred to as cluster analysis) to identify commonalities in the inputs. ML engine 138 may group (i.e., cluster) the inputs based on those commonalities. ML engine 138 may use hierarchical clustering, k-means clustering, and/or another clustering method or combination thereof.

In some embodiments, ML engine 138 includes an artificial neural network. An artificial neural network includes multiple nodes (also referred to as artificial neurons) and edges between nodes. Edges may be associated with corresponding weights that represent the strengths of connections between nodes, which the ML engine 138 adjusts as machine learning proceeds. Alternatively or additionally, ML engine 138 may include a support vector machine. A support vector machine represents inputs as vectors. ML engine 138 may label, classify, and/or categorizes inputs based on the vectors. Alternatively or additionally, ML engine 138 may use a naïve Bayes classifier to label, classify, and/or categorize inputs.

Alternatively or additionally, given a particular input, ML engine 138 may apply a decision tree to predict an output for the given input. Alternatively or additionally, ML engine 138 may apply fuzzy logic in situations where labeling, classifying, and/or categorizing an input among a fixed set of mutually exclusive options is impossible or impractical. The aforementioned ML model and techniques are discussed for exemplary purposes only and should not be construed as limiting one or more embodiments.

In some embodiments, as ML engine 138 applies different inputs to a ML model, the corresponding outputs are not always accurate. As an example, ML engine 138 may use supervised learning to train the ML model. After training the ML model, if a subsequent input is identical to an input that was included in labeled training data and the output is identical to the supervisory signal in the training data, then output is certain to be accurate. If an input is different from inputs that were included in labeled training data, then ML engine 138 may generate a corresponding output that is inaccurate or of uncertain accuracy. In addition to producing a particular output for a given input, ML engine 138 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

Figure 6:
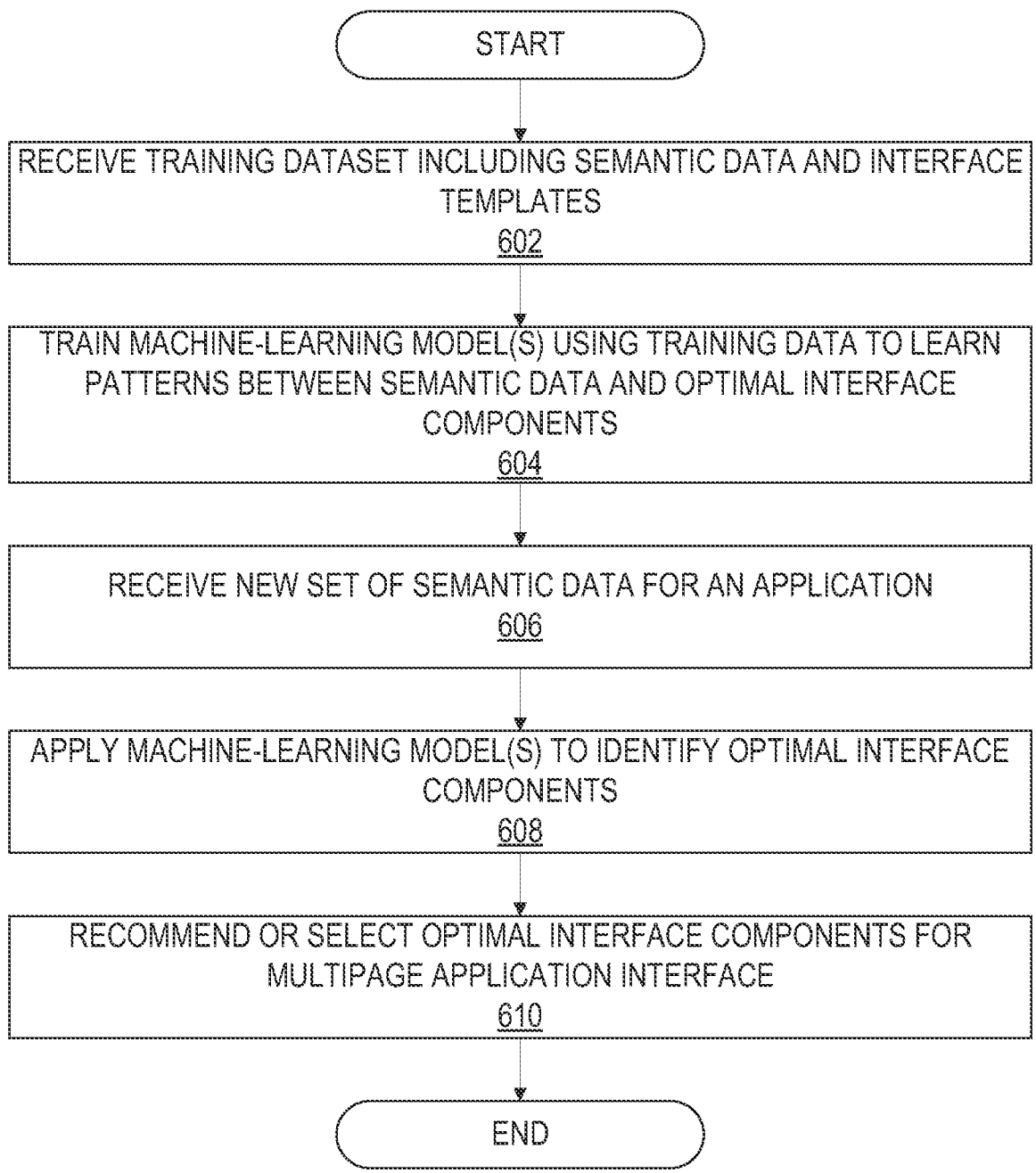
FIG. 6 illustrates an example set of operations for recommending or selecting a multipage navigable interface template using machine learning in accordance with some embodiments.

FIG. 6 illustrates an example set of operations for recommending or selecting a multipage navigable interface template using machine learning in accordance with some embodiments. One or more operations illustrated in FIG. 6 may be modified, rearranged, or omitted altogether. Accordingly, the particular sequence of operations illustrated in FIG. 6 should not be construed as limiting the scope of one or more embodiments.

Referring to FIG. 6, the process includes receiving a training dataset including example semantic data and corresponding interface templates (operation 602). As previously indicated, with supervised training, the training dataset may comprise labeled examples. For instance, a training example may be labeled to indicate whether an interface template is compatible, incompatible, optimal, or suboptimal for a given set of semantic data. The training data may leverage feedback from designers and/or other users to determine which interface templates were positively or negatively received.

In some embodiments, the process trains an ML model using the training data learn patterns between semantic data and optimal interface templates and/or UI components (operation 604). The training process may include formulating a set of one or more feature vectors for each training example that encode the presence and absence of a given feature in the example, such as the presence or absence of a UI component or other UI feature. Encoding techniques such as one hot encoding may be used to generate the feature vectors and may vary depending on the particular implementation.

In some embodiments, the training process separates a portion of the training data into a test set to evaluate the ML model. The training examples may be used to determining ML model parameters, such as weights and biases for nodes in a neural network or hyperplane parameters in a support vector machine. The training process may vary depending on the particular ML model. For neural networks, the training process may adjust weights and/or other cell parameters using backpropagation and gradient descent to minimize an error of a loss function. Additionally or alternatively, other training algorithms may be employed, which may vary from model to model.

In some embodiments, the process receives a new set of semantic data for an application (operation 606). For example, the process may receive a high-level application flow diagram, such as application flow 300. The set of semantic data may comprise a unique combination of feature values not previously encountered by system 100 and/or not included in the training dataset.

In some embodiments, the process applies the trained ML model to identify an optimal interface template and/or set of UI components (operation 608). Applying the model may include forming a feature vector in the same manner used for the training examples during model training. For example, the process may extract a set of features from the semantic data and the user submitting the semantic data. The trained ML model may then output a predicted compatibility rating or likelihood that the user will select an interface template as a function of the feature vector. With a neural network, forward propagation may be used to apply the model weights and biases to generate the output. Other ML models may estimate a label and/or otherwise generate a prediction using other techniques, such as based on the distance of the feature vector to various clusters or the location of the feature vector within a hyperplane.

In some embodiments, the process recommends or selects an interface template and/or set of UI components for the multipage application interface based on the ML model output obtained from applying the ML model to the new set of semantic data (operation 610). When recommending interface templates, the process may rank-order templates based on a score, representing a compatibility rating or predicted likelihood that the developer will select the template given the set of semantic data and user attributes. The developer may preview the interface templates including sample renderings for pages and/or other UI elements before selecting the template. Once selected, the developer may customize and/or otherwise configure UI components as previously described.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
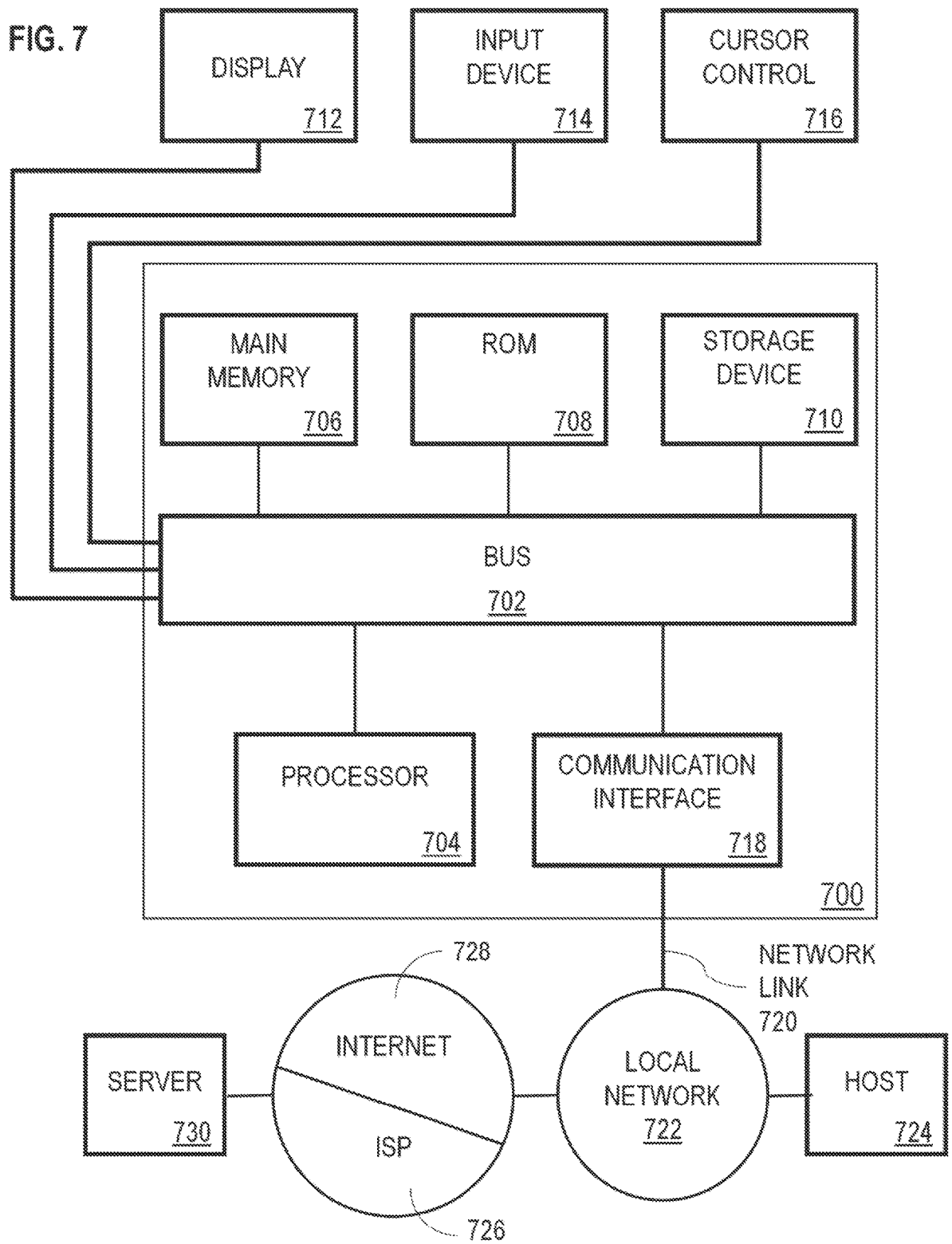
FIG. 7 shows a block diagram that illustrates a computer system in accordance with one or more embodiments.

For example, FIG. 7 is a block diagram that illustrates computer system 700 upon which an embodiment of the invention may be implemented. Computer system 700 includes bus 702 or other communication mechanism for communicating information, and a hardware processor 704 coupled with bus 702 for processing information. Hardware processor 704 may be, for example, a general purpose microprocessor.

Computer system 700 also includes main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT) or light emitting diode (LED) monitor, for displaying information to a computer user. Input device 714, which may include alphanumeric and other keys, is coupled to bus 702 for communicating information and command selections to processor 704. Another type of user input device is cursor control 716, such as a mouse, a trackball, touchscreen, or cursor direction keys for communicating direction information and command selections to processor 704 and for controlling cursor movement on display 712. Input device 714 typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 700 can receive the data on the network line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, from a user by a service for generating multipage navigable interfaces as a function of semantic data, a definition of an application flow and a semantic definition of application functions, wherein the application flow indicates a flow between different application pages and the semantic definition identifies information and actions to make available in the multipage navigable interface;
responsive to receiving the definition of the application flow, identifying, by the service, a template of a multipage navigable interface that is compatible with the application flow, wherein the template encapsulates a set of functions that are independent of the semantic definition and includes a set of user interface components;
responsive to receiving the semantic data, mapping, by the service, different actions identified by the semantic definition to different user interface components in the set of user interface components;
generating, based on the template and the mapping, the multipage navigable interface comprising the set of user interface components for presenting the information and invoking the actions identified in the semantic definition, wherein a layout of the user interface components within the multipage navigable interface are determined independently of the semantic definition.

2. A system comprising:
at least one hardware processor; and
at least one non-transitory computer readable medium comprising instructions which, when executed by the at least one hardware processor, causes performance of operations comprising:
receiving, from a user by a service for generating multipage navigable interfaces as a function of semantic data, a definition of an application flow and a semantic definition of application functions, wherein the application flow indicates a flow between different application pages and the semantic definition identifies information and actions to make available in the multipage navigable interface;
responsive to receiving the definition of the application flow, identifying, by the service, a template of a multipage navigable interface that is compatible with the application flow, wherein the template encapsulates a set of functions that are independent of the semantic definition and includes a set of user interface components;
responsive to receiving the semantic data, mapping, by the service, different actions identified by the semantic definition to different user interface components in the set of user interface components;
generating, based on the template and the mapping, the multipage navigable interface comprising the set of user interface components for presenting the information and invoking the actions identified in the semantic definition, wherein a layout of the user interface components within the multipage navigable interface are determined independently of the semantic definition.

3. A non-transitory computer readable medium comprising instructions which, when executed by at least one hardware processor, causes performance of operations comprising:
receiving, from a user by a service for generating multipage navigable interfaces as a function of semantic data, a definition of an application flow and a semantic definition of application functions, wherein the application flow indicates a flow between different application pages and the semantic definition identifies information and actions to make available in the multipage navigable interface;
responsive to receiving the definition of the application flow, identifying, by the service, a template of a multipage navigable interface that is compatible with the application flow, wherein the template encapsulates a set of functions that are independent of the semantic definition and includes a set of user interface components;
responsive to receiving the semantic data, mapping, by the service, different actions identified by the semantic definition to different user interface components in the set of user interface components;
generating, based on the template and the mapping, the multipage navigable interface comprising the set of user interface components for presenting the information and invoking the actions identified in the semantic definition, wherein a layout of the user interface components within the multipage navigable interface are determined independently of the semantic definition.

4. The non-transitory computer readable medium as recited in claim 3, wherein the actions include at least one primary action that initiates at least one database transaction when invoked and at least one secondary action that performs a function that does not initiate any database transactions when invoked.

5. The non-transitory computer readable medium as recited in claim 3, wherein navigation between different pages in the multipage navigable interface is defined in the template and independent of the semantic definition.

6. The non-transitory computer readable medium as recited in claim 3, wherein a messaging system for presenting messages via the multipage navigable interface is defined in the template and independent of the semantic definition.

7. The non-transitory computer readable medium as recited in claim 3, wherein a save model that controls when a transaction may be submitted is defined in the template and independent of the semantic definition.

8. The non-transitory computer readable medium as recited in claim 3, wherein a save model for controlling when a transaction may be committed is defined in the template and independent of the semantic definition.

9. The non-transitory computer readable medium as recited in claim 3, wherein a type of user interface component is automatically selected independently of the semantic definition when generating the multipage navigable interface.

10. The non-transitory computer readable medium as recited in claim 3, wherein a size of the user interface components is automatically selected independently of the semantic definition when generating the multipage navigable interface.

11. The non-transitory computer readable medium as recited in claim 3, wherein the instructions further cause: changing the template of the multipage navigable interface; responsive to changing the template, generating, without updating the semantic definition, an updated multipage navigable interface using a different set of user interface components defined in the changed template.

12. The non-transitory computer readable medium as recited in claim 3, wherein the instructions further cause: changing a design of a user interface component in the set of user interface components; responsive to changing the design of the user interface component, updating user interfaces across a plurality of application flows using the user interface component without changing semantic definitions identifying application-specific functions invokable by the user interface component.

13. The non-transitory computer readable medium as recited in claim 3, wherein a user interface component in the set of user interface components is a composite component formed from two or more other user interface components; wherein the instructions cause selecting the two or more other user interface components to include in the composite component based at least in part on the semantic definition.

14. The non-transitory computer readable medium as recited in claim 13, wherein at least one of the two or more user interface components exposes a primary action and at least another of the two or more other user interface components exposes a secondary action associated with a page.

15. The non-transitory computer readable medium as recited in claim 13, wherein the instructions further cause determining whether to include or exclude a user interface component from the composite component based at least in part on the semantic definition.

16. The non-transitory computer readable medium as recited in claim 3, wherein the instructions further cause: training a machine learning model to automatically learn relationships between user interface characteristics and application characteristics; wherein the layout is determined using the trained machine learning model.

17. The non-transitory computer readable medium as recited in claim 3, wherein the instructions further cause: training a machine learning model to automatically learn relationships between user interface characteristics and application characteristics; and recommending, as a function of the machine learning model, a change in the template of the multipage navigable interface based at least in part on the semantic definition.

18. The non-transitory computer readable medium as recited in claim 3, wherein the instructions further cause: receiving a change to the semantic definition; and responsive to receiving the change to the semantic definition, recommending a new template for the multipage navigable interface.

19. The non-transitory computer readable medium as recited in claim 3, wherein the instructions further cause binding a function to an adapter; associating a user interface component with the adapter based on the template such that the user interface component invokes the function through the adapter; and detecting an update to the template that changes the user interface component; and responsive to the update to the template, changing the user interface component that is associated with the adapter.

20. The non-transitory computer readable medium as recited in claim 3, wherein the instructions further cause: virtually plugging in, by the service, at least one action to an adapter associated with a user interface component, wherein virtually plugging in the at least one action to the adapter includes binding the adapter to an endpoint to access data responsive to database commands submitted through the endpoint.

* * * * *